United States Patent [19]

Nip et al.

[11] Patent Number: 4,751,091

[45] Date of Patent: Jun. 14, 1988

[54] PRESERVATION OF REDDISH COLOR OF LYCHEE PERICARP

[75] Inventors: Wai-Kit Nip, Honolulu; Tung Liang, Kailua, both of Hi.

[73] Assignee: University of Hawaii, Manoa, Honolulu, Hi.

[21] Appl. No.: 897,151

[22] Filed: Aug. 15, 1986

[51] Int. Cl.[4] .......................... A23B 7/16; A23B 7/08; A23L 1/272

[52] U.S. Cl. .................................. 426/268; 426/270; 426/304; 426/310; 426/524; 426/327; 426/308

[58] Field of Search ...................... 426/321.68, 335, 93, 426/102, 103, 304, 308, 309, 310, 268, 270, 327, 331, 335, 532, 615, 524

[56] References Cited

U.S. PATENT DOCUMENTS 4,547,376  10/1986  Silver et al. ..................... 426/102

FOREIGN PATENT DOCUMENTS 0496936  12/1938  United Kingdom ................ 426/102

OTHER PUBLICATIONS

Akamine (1960), Tech, Prog. Rep. 127, HAES, Univ. of Hawaii.
Goto (1960) in "Technical Papers of the First Pacific Rim Food Conf.", Honolulu, HI, May 19-25, 1960, pp. 15-23.
Kuhn (1961), Progress Report, Fla. Agr. Exp. Sta., Journal of Florida State Horticultural Society, (1962), 75:273-277.
Ross et al. (1969), Trans. of the Amer. Soc. of Agric. Engn., 12(1):20-26.
Report of the Guang Dung Province Coordinating Committee on Litchi Storage (1975), Acta Botanica Sinica, 17:303-308; and English translation.
Report of the Guang Dung Province Coordinating Committee on Litchi Storage (1975); Japanese text.

*Primary Examiner*—Marianne Cintins
*Attorney, Agent, or Firm*—Tilton, Fallon, Lungmus & Chestnut

[57] ABSTRACT

The reddish pericarp color of whole fresh lychee fruit is preserved by applying a composition of a food acid, an edible reducing agent, and a carbohydrate thickener to the pericarp surfaces, and thereafter storing the coated fruit at a low temperature. After initial coating, the lychee fruit is preferably frozen and then recoated before storage in frozen condition.

9 Claims, No Drawings

PRESERVATION OF REDDISH COLOR OF LYCHEE PERICARP

FIELD OF INVENTION

The field of this invention is the preservation of lychee fruit, and more particularly the preservation of the reddish pericarp color of freshly picked lychee fruit.

BACKGROUND OF INVENTION

Lychee (*Litchi chinensis Sonn.*) is a subtropical evergreen belonging to the family Sapincaceae. When the lychee fruit is fully mature, its pericarp (shell) is thin, hard and somewhat warty in texture. (The term "litchee nut" is sometimes used.) Depending on the variety, the color of the pericarp is bright red or rose colored, with-/without some green color. The edible portion of the fruit is a white to creamcolored translucent pulp that surrounds a glossy, brown seed.

The harvesting season for lychee fruit is very short, lasting only a few weeks, and the fruit are highly perishable. The pericarp is subject to red color loss and development of browning, whether stored at room temperature, under refrigeration, or the frozen state. Discoloration of lychee renders them less attractive to users and is accompanied by other changes which result in spoilage of the food. Loss of red color is an indication of lack of freshness. Consequently, marketing of fresh lychee fruit has been restricted. This has led to preserving lychee fruit by canning, and/or drying procedures.

When fresh lychees are stored at room temperature, dessication with its accompanying loss of red color and development of browning can occur very quickly. The appearance of browning renders the fruit unsalable and is thus of commercial importance. The attractive shelf life of fresh lychees without any protection is not over 72 hours when held at room temperature.

Browning is believed to be induced by dessication of the pericarp and the accompanying enzymatic reaction of polyphenol oxidase. See Akamine (1960), *Tech. Prog. Rep.* 127, HAES, Univ. of Hawaii.

In 1960 Goto reviewed procedures for the processing of lychee fruit. Goto (1960) in "Technical Papers of the First Pacific Rim Food Conf.", Honolulu, Hi., May 19-25, 1960, pp. 15-23. This review reported that tests conducted in Florida involved dipping the fresh lychee for one minute in a 1.5% aqueous solution of the sodium salt of dehydroacetic acid followed by air-drying. But this treatment kept only 43% of the treated fruit in good condition for ten days. It was also reported that freezing of lychee fruit preserved the reddish color of the pericarp while the fruit remained frozen, but that on thawing the red color was lost and the fruit rapidly turned brown.

Heretofore attempts to use chemical treatments have provided only a partial answer to the problem of prevention of pericarp browning. Treatment with ascorbic acid or citric acid solutions were found to be ineffective in preventing browning at room temperature. Akamine (1960), cited above. Kuhn had reported that dried lychee fruits which were blanched, sulfited and dipped in 0.5% citric acid prior to dehydration had improved color quality. Kuhn (1961), Progress Report, Fla. Agr. Exp. Sta., published in *Journal of Florida State Horticultural Society* (1962) 75:273-277. However, Ross et al. continuing the studies of Kuhn, found that this predrying treatment degraded the taste properties of the fruit. Ross et al. (1969), Trans. of the Amer. Soc. of Agric. Engn., 12(1):20-26.

Studies on the prevention of browning have been conducted in China where lychees are an important fruit crop. See Report of the Guang Dung Province Coordinating Committee on Litchi Storage (1975), *Acta Botanica Sinica*, 17:303-308 (in Chinese). Steaming (blanching) was tested in combination with several chemical treatments which included applying an aqueous solution of citric acid. While the pericarp color could be maintained during frozen storage, browning occurred within a few hours after thawing. In one test, the blanched fruit were treated with 5-10% aqueous citric acid, or a solution of 5% citric acid and 0.1% ascorbic acid. The frozen fruits after thawing retained their red color for only two to three hours.

SUMMARY OF THE INVENTION

In the method of the present invention for preserving the reddish pericarp color, fresh whole lychee fruit are coated with a liquid composition comprising an aqueous solution of a food acid, an edible reducing agent, and a carbohydrate thickener. The food acid is employed at a concentration of 3 to 12 wt % or preferably 5-10 wt %. The edible reducing agent, which may be ascorbic acid or an ascorbate salt, is employed in a concentration sufficient to maintain a reducing condition in the composition after application to the lychee. The carbohydrate thickener, which may be a sugar like sucrose, glucose or hydrolyzed starch polysaccharides, should be present in a sufficient concentration to form a sticky adherent syrup. The viscous character of the coating composition due to the carbohydrate thickener makes it possible to apply a relatively thick adherent coating to the pericarp. The coatings provide a chemical environment in which the reddish color is maintained and even accentuated. The coating also tends to retain water and limits dessication of the pericarp.

The concentration of the food acid acts upon the anthocyanin pigments of the pericarp. In the environment of the coating composition, these pigments are partially hydrolyzed to a form in which the reddish or pinkish color is enhanced. The reducing environment assists in maintaining the reddish color under refrigerated or frozen storage, as well as after warming of the fruit to room temperature.

While food acids such as citric have been used to preserve edible portions of fruit they have not heretofore been employed in the manner of the present invention. The pericarp is a non-edible portion of the lychee. In accordance with this invention, food acid can act effectively on the pericarp to enhance, maintain and extend the attractive appearance of the fruit.

The method of this invention may be employed in connection with refrigerated non-frozen storage of lychee. In that embodiment, the coating composition is applied to the fresh fruit to provide a coating which is maintained thereon during the refrigerated storage. In a different more preferred embodiment of the invention, the fruit is initially coated, subjected to freezing, recoated with the coating composition, and then stored in frozen condition. This "dip-freeze-dip-store" procedure makes it possible to retain the red color for longer periods of time both during and after frozen storage.

DETAILED DESCRIPTION

The method of this invention can be applied to any variety of lychee fruit, including varieties which when harvested have a bright red color, as well as varieties which are rose colored, including mixtures of rose and green coloration. The lychee fruit are preferably treated as soon after picking as practical. In general, the coating solution should be applied within about 1 to 72 hours after picking of the fruit, and preferably within 1 to 24 hours.

Before coating, the fruit will be sorted and washed. There are standard procedures for lychee fruit handling.

The treating composition is prepared as a viscous aqueous solution. Ordinary potable tap water may be employed at ambient room temperatures (65°–85° F.).

Since all of the ingredients are water-soluble, the crystals can be prepared in any conventional dispersion device, such as open-topped tank equipped with a stirrer. The food acid and edible reducing agent may be dissolved first and then the carbohydrate thickener added, or all of the ingredients may be introduced into the water at the same time and stirred until fully dissolved.

The food acid is preferably citric but other food acidulants may be used. These include the food acids which are generally recognized as safe (GRAS), such as fumaric, malic, acetic, lactic, or phosphoric acids. In relation to the total formulation of the coating composition, the food acid should be used at a concentration within the range from 3 to 12% by weight. A preferred concentration particularly with reference to citric acid is 5 to 10 % by wt.

The edible reducing agent is preferably ascorbic acid, which may be employed either in free acid form or as a water-soluble salt, viz. sodium or potassium salt of ascorbate. The ascorbate salts can be used on the same weight basis as ascorbic acid. In general the amount employed should be sufficient to maintain a reducing environment during storage of the fruit. Ascorbic acid, alkali metal ascorbate, etc., can be employed at concentrations of up to 2% by weight of the composition. With reference to ascorbic acid or an ascorbate salt, a concentration of 0.1 to 1.0 wt % can be used, preferred concentrations about 0.3 to 0.7 wt % of ascorbic acid.

The carbohydrate thickener is an important ingredient. It should be used in an amount sufficient to produce a sticky, adherent syrup. For example, sucrose or glucose can be employed in amounts of from 5 to 15 wt % of the composition. A preferred concentration range is from about 8 to 12 wt %. Other water-soluble carbohydrates, including oligosaccharides, can be used. For example, hydrolyzed starch, such as corn syrup, can be substituted for sucrose.

In forming the liquid composition, the water can be warmed to promote dissolving of the ingredients. Preferably, however, the crystals are applied to the lychee fruit at room temperatures, viz. from 65° to 85° F. Chilling of the coating solution prior to application can be used if needed.

The particular application procedure is not critical. However, the coating solution should be applied to form substantially continuous coatings on the outer pericarp surfaces. Dipping of the fruit in the solution is an effective method of application. Other techniques can be used, such as spraying.

In some cases, it may be desirable to soak the fruit in the coating solution for several hours. Where the pericarp has begun to discolor and turn brown, the red color can be at least partially restored by soaking of the fruit for periods of 12 to 30 hours. Where the fruit is in fresh condition and the red color is present, soaking or dipping times of from about 0.2 to 1.0 minutes are sufficient.

Following the coating the fruits are drained to allow excess coating solution to run off. Because of the adherent character of the coating composition, the fruit will retain an adherent coating of the composition over the outer pericarp.

Following completion of the coating procedure as described above, the fruit may be placed in refrigerated storage at a temperature below about 40° F. but above the freezing temperature of the fruit, viz. above 32° F. Refrigerated storage temperatures of from 35° to 45° F. are advantageous. When properly coated the refrigerated fruit can be expected to maintain satisfactory red color for periods of from about 40 to 60 days. On removal from refrigerated storage and warming to room temperature, the red color will persist for several hours.

In a preferred embodiment of the method of this invention, the reddish-colored lychee fruit, after coating by the procedure described above, are subjected to freezing. Cryogenic freezing, such as by liquid nitrogen freezing, can be used but is not required. Ordinary air freezing can be employed. For example, the lychee fruits after usual sorting and rinsing procedures are dipped in the coating solution, then placed in a freezer at a temperature well below 0° C., such as −15° to −30° C. For liquid nitrogen freezing, the coated fruits may be dipped in or sprayed with liquid nitrogen until the fruits are completely frozen in a few seconds. However, for commercial application, it is believed that air blast freezing will produce excellent results, and is considerably less expensive than liquid nitrogen freezing.

For reasons not fully understood, if the coated and frozen fruit are stored without further treatment, loss of pigment color with consequent browning begins to occur during frozen storage. But it has been found that this can be substantially prevented by recoating of the fruit. The procedure for recoating is essentially the same as the initial coating, the same solution being used and applied in a similar manner. Such recoating is preferably carried out rapidly to avoid thawing of the fruit. If desired, to minimize thawing of the frozen fruit, the coating solution may be chilled when it is applied, such as at temperatures from about 32° to 40° C.

When the frozen lychee fruit have been prepared according to the above preferred process, they can be stored for a number of months without loss of their desirable reddish color. In general, frozen storage for about 12 months or longer is feasible. Prior to use the frozen lychees may be permitted to thaw, and then maintained either under non-freezing refrigeration or at ordinary room temperatures. Storage under refrigerated temperatures from about 32° to 40° F. is preferred. When thawed and stored under refrigerated conditions, the red color can be maintained on the average from about 24 hrs. to 2 months. Even when the fruit is thawed and stored at room temperature, the red color can be maintained for several hours.

It has been found that the recoating of the frozen fruit in effect provides a "glaze" over the pericarp, which is maintained during frozen storage. The glazed fruit resist dehydration, retain moisture, and maintain their reddish or pinkish form. The glaze provides a reducing environment which tends to prevent the enzymatic reaction of polyphenol oxidase.

The method of this invention is further illustrated by the following commercial and experimental examples.

EXAMPLE I

Clean the freshly harvested, ripe lychee fruits and grade them for sizes and maturity. Discard all the damaged and overripe fruits. Dip the fruits in perforated baskets in the solution containing 10% citric acid, 1% ascorbic acid and 10% surcrose for 2 minutes at ambient temperature and then drain for 1 minute (or until the fruits are not dripping.) If a conveyor system is used, convey the fruits through a tunnel and spray with the solution for two minutes and drain for 1 minute (or until the fruits are not dripping.) Pass the treated fruits through an air blast freezer for about 20 minutes to individually quick freeze the fruits (or until the fruits are completely individually quick frozen). If liquid nitrogen spray is used for the freezing process, it should not take more than 1 minute to complete the process. Spray frozen fruits with or dip the fruits in the same solution at 35° F. for 5 seconds or until the frozen fruits are completely glazed. Package the frozen fruits in transparent laminated bags (with low water vapor transfer coefficient) and vacuum seal if possible. Store the frozen fruits in packages in a freezer at −0° F. or below.

EXAMPLE II

Clean the freshly harvested, ripe lychee fruits and grade them for sizes and maturity. Discard all the damaged and overripe fruits. Dip the fruits in perforated baskets for 10 minutes in the solution containing 10% citric acid, 1% ascorbic acid and 10% sucrose at ambient temperature. Allow the fruits to drip for 1 minute. Package and seal the treated fruits in large laminated bags (with low water vapor transfer coefficient and strong resistance to puncture) for bulk storage or in small consumer size packages. Store the packaged fruits in refrigerated chambers or display areas at 35° F.

EXAMPLE III

Experiments were conducted to compare the different treatments on the color of frozen and thawed lychee fruits (i.e., control (air freezing), air freezing-glaze, dip-air freezing, dip-air freezing-glaze, dip-dry ice freeze-glaze, dip-liquid nitrogen freeze-glaze, dip-liquid carbon dioxide freeze-glaze). The solution for dipping and glazing contained 10% citric acid, 1% ascorbic acid and 10% sucrose. Dipping time was 10 seconds at ambient temperature and glazing time was 5 seconds at 35° F. After glazing the fruits were stored in double layered plastic bags in storage freezer at 10° F. Samples were evaluated periodically by thawing the different frozen samples in tap water at ambient temperature for about 5–10 minutes until the fruits were completely thawed. The thawed fruits were dripped/blotted dried and evaluated visually. Results were summarized in Table 1 (below).

It was clearly demonstrated that the dip-freeze-glaze processes were better than the freeze-glaze or dip-freeze process and could maintain the color during freezing and thawing. The thawed, treated fruits in sealed plastic bags could maintain the color for several weeks under refrigerated condition (35° F.). This has significant benefit to the lychee industry since lychee fruits could be frozen and marketed worldwide year round with its natural or better than natural color. Non-frozen refrigerated or thawed and refrigerated lychee fruits could be marketed with its better than natural color for three to four weeks and the fruits would be available for a longer period of time.

TABLE 1

Comparison of pericarp color of thawed lychee fruits

| Variety | Treatment | Test 1[a], 3 hr. | Test 1[a], 24 hr. | Test 2, 3 hr. |
|---|---|---|---|---|
| Kwai Mi | Air freeze (Control) | Dark purple | Dark purple | Dark purple |
|  | Air-freeze-glaze | Red with brown areas | Red with brown shade | Brown with red shade |
|  | Dip-Air freeze | Brown with reddish shade | Brown with very little red | Brown with red shade |
|  | Dip-Air freeze-glaze | Reddish pink | Reddish pink | Reddish pink |
|  | Dip-Dry ice freeze-glaze | Reddish pink | Reddish pink | Reddish pink |
|  | Dip-Liquid nitrogen-glaze | Reddish pink | Reddish pink | Reddish pink |
| Groff | Dip-Liquid carbon dioxide-glaze | Reddish pink | Reddish pink | Reddish pink |
|  | Dip-Refrigerated storage for 21 days in plastic bags | Reddish pink | Reddish pink | Fruits not available |

[a]Test 1 — Fruits frozen for 60-70 days, thawed, and held for 3/24 hrs.
[b]Test 2 — Fruits frozen for about 120 days

We claim:

1. In a method for preserving the reddish pericarp color of whole fresh lychee fruit, which method includes the steps of applying an aqueous treating solution containing a food acid and an edible reducing agent to the lychee fruit, and subsequently freezing the thus treated fruit, wherein the improvement comprises: incorporating in said treating solution a carbohydrate thickener in a sufficient amount to form a sticky adherent syrup; and following freezing of the treated fruit, applying an additional amount of said sticky adherent syrup to the outer pericarp surfaces of the fruit to form a glaze thereon;, and thereafter storing the glazed fruit in frozen condition.

2. The method of claim 1 in which said food acid is citric acid and said reducing agent is ascorbic acid or an edible water-soluble salt thereof.

3. The method of claim 1 in which said carbohydrate thickener is sucrose.

4. The method of claim 1 in which said sticky adherent syrup contains on a weight percent basis from 3 to 12% citric acid, from 0.1 to 1.0% ascorbic acid, and from 5 to 15% sucrose.

5. The method of claim 1 in which said sticky adherent syrup contains on a weight percent basis from 5 to 10% citric acid, from 0.3 to 0.7% ascorbic acid, and from 8 to 12% sucrose.

6. The method of claim 1 in which said reducing agent is ascorbic acid and said sticky adherent syrup contains from 0.3 to 0.7 weight percent ascorbic acid.

7. The method of claim 1 in which said sticky adherent syrup is applied to the frozen fruit by dipping the fruit in the sticky adherent syrup.

8. The method of preserving the reddish pericarp color of fresh whole lychee fruit, comprising:

(a) preparing a sticky adherent syrup of citric acid, ascorbic acid, and sucrose, said sticky adherent syrup on a weight percent basis containing from 3 to 12% citric acid, from 0.1 to 1.0% ascorbic acid, and from 5 to 15% sucrose;

(b) dipping the fresh lychee fruit in the said sticky adherent syrup;

(c) freezing the dipped fruit;

(d) dipping the frozen lychee fruit in said sticky adherent syrup thereby forming a glaze coating on the exterior surfaces of the fruit; and (e) storing the glazed fruit in frozen condition.

9. The method of claim 8 in which said sticky adherent syrup contains from 5 to 10 wt. % citric acid, from 0.3 to 0.7 wt. % ascorbic acid, and from 8 to 12 wt. % sucrose.

* * * * *